United States Patent [19] [11] 4,057,538
Habu et al. [45] Nov. 8, 1977

[54] METHOD FOR HARDENING GELATIN

[75] Inventors: Teiji Habu; Tsuneo Wada; Takashi Sasaki; Shigemasa Itoh; Takayoshi Ohmura; Hiroki Ishii; Hisashi Yamaguchi, all of Hino, Japan

[73] Assignee: Konishiroku Photo Industry Co., Ltd., Tokyo, Japan

[21] Appl. No.: 549,329

[22] Filed: Feb. 12, 1975

[30] Foreign Application Priority Data

Feb. 13, 1974 Japan ................................ 49-17942

[51] Int. Cl.[2] ................................ C09H 7/00
[52] U.S. Cl. ................................ 260/117; 96/111
[58] Field of Search ................................ 96/111; 260/117

[56] References Cited

U.S. PATENT DOCUMENTS

| | | | |
|---|---|---|---|
| 2,938,892 | 5/1960 | Sheehan | 96/111 |
| 2,946,819 | 7/1960 | Coles | 96/111 |
| 3,100,704 | 8/1963 | Coles | 96/111 |
| 3,392,024 | 7/1968 | Burness | 96/111 |
| 3,455,893 | 7/1969 | Froehlich | 260/117 |
| 3,676,143 | 7/1972 | Himmelmann | 96/111 |
| 3,832,181 | 8/1974 | Dallon | 96/111 |
| 3,841,872 | 10/1974 | Burness | 260/117 |
| 3,850,639 | 11/1974 | Dallon | 96/111 |
| 3,868,257 | 2/1975 | Horii | 96/111 |

*Primary Examiner*—Paul R. Michl
*Attorney, Agent, or Firm*—Bierman & Bierman

[57] ABSTRACT

This invention relates to a method of hardening gelatin which is accomplished by combining a compound containing at least one carbo-di-imide group with a compound having at least two vinyl sulfonyl groups. This combination has application to the photographic industry by providing a method of hardening the type of gelatin which is used in a gelatin — containing photographic layer of a light-sensitive halide photographic material.

6 Claims, No Drawings

METHOD FOR HARDENING GELATIN

This invention relates to a method for hardening gelatin using a hardner, particularly to a gelatin-hardening method suitable for hardening gelatin films of light-sensitive silver halide photographic materials.

Generally, light-sensitive silver halide photographic materials are prepared by forming various layers such as silver halide emulsion layer, filter layer, inter layer, protective layer, sub layer, antihalation layer, etc, on a suitable support such as glass, paper or synthetic resin film. Since these layers are so-called gelatin films composed mainly of gelatin, the physical properties of these layers are dependent chiefly upon those of gelatin. However, gelatin itself has such properties as being low in melting point, high in water-swellability and inferior in mechanical strength, which properties are fatal defects as the physical properties of layers constituting light-sensitive silver halide photographic materials. In order to improve the physical properties of gelatin, various hardners have heretofore been applied to gelatin to cause crosslinking reaction with amino, carboxyl, amide or the like functional group in the molecules of gelatin. As such hardners, there have been known from old time inorganic hardners composed of polyvalent metal salts such as chromium salts for example, chromium alum and chromium chloride or aluminum salts and organic hardners such as formalin, glyoxal, acrolein and their derivatives, for example. When viewed from photographic standpoint, however, said hardners have such many disadvantages that, for example, they cause strong desensitization, accelerate fogging, injure color-forming ability of couplers in photographic emulsions, or are too moderate in hardening action to use practically. Some of the hardners have excessively strong hardening action, so that light-sensitive silver halide is difficultly produced. In some of the hardners, desired hardening effect is obtained only after long period. Moreover, with recent spread-up industrial process, photographic materials are demanded to be processed at high speed. Accordingly, photographic materials are being improved so as to be in confirm to quick processing, and developers also are being improved so as to be suitable for quick development of such photographic materials. For example, in order to make the penetration of processing solution quicker, photographic materials are made thinner by increasing the amount of silver halide and decreasing the amount of gelatin, with the result that fog increases and the physical properties of films are deteriorated. In addition thereto, with recent spread of automatic processing machines, photographic materials are required to have mechanical strength at high degree so as to be with standable to severe mechanical abrasion, and with spread of high-temperature short-period processing using strong processing solutions, they are required to be stronger in film properties without degradation in photographic properties.

As the result of such quick processing of photographic materials as mentioned above, most of the compounds which have heretofore known as excellent hardners bring about various disadvantages. For example, if the amount of the hardner added to a photographic material is increased in order to make gelatin strong in film properties, not only the photographic material is degraded in desensitization and in increase of fog but also the gelatin in the photographic material is deteriorated in covering power. Even if a photographic film in which gelatin is sufficiently hardened is obtained, the film will be so brittle that it becomes difficult to apply the photographic film to an automatic processing machine.

An object of the present invention is to provide a hardner which brings about no such disadvantages as mentioned above. Another object of the invention is to provide a method for hardening gelatin by use of the said hardner which is particularly suitable for the hardening of gelatin films of light-sensitive silver halide photographic materials.

The above objects are accomplished by using as the hardener, combination of a compound having at least one carbo -di-imide group in the molecule with a compound having at least two vinylsulfonyl groups in the molecule. By the use of one or more than two kinds of the compound having the carbo-di-imide group in the molecule and one or more than two kinds of the compound having at least two vinylsulfonyl groups in the molecule, gelatin films of the photographic materials can be successfully be hardened without accompanying desensitization and increased fogging even in the case where the photographic material is made thinner by decreasing the amount of gelatin. Further, even when the photographic material is subjected to high temperature processing using strong processing solutions, the combination of said compounds displays excellent hardening capable of with standing to high temparature processing and to machanical abrasion occuring in an automatic processing machine without incereased fogging. Moreover, said hardening action is displayed quite quickly and, in case the hardner, i.e. the combination of said compounds, is incorporated into a coating liquid for forming a gelatin film, a desired hardening quickly occurs immediately after coating of the liquid and the so-called post-hardening due to spontaneous incubation or heat treatment scarcely takes place to make it possible a light sensitive silver halide photographic material having stable quality. Such markedly quick hardening action is a synergistic action and quite unexpectable from the case where the compounds used in combination in the present invention are employed respectively singly.

The compounds having at least one carbo-di-imide group in the molecule, which compound are used in the present invention, are described, for example, U.S. Pat. Nos. 2,938,892, 3,100,704 and 3,135,748. Concrete examples of said compounds are listed below. These compound can be synthesized according to the methods described in the above mentioned U.S. Patents.

(I-1)

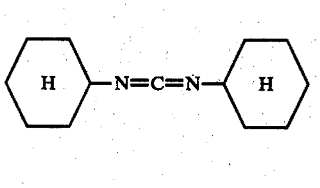

-continued
(I-2)
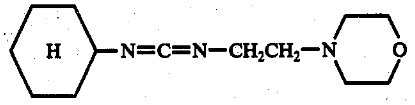
(I-3)
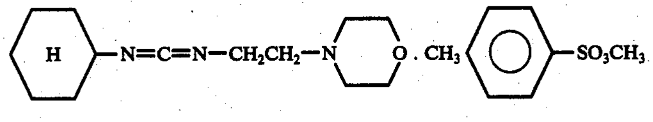
(I-4)
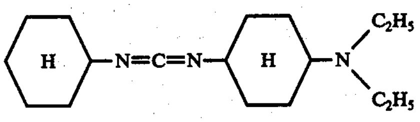
(I-5)
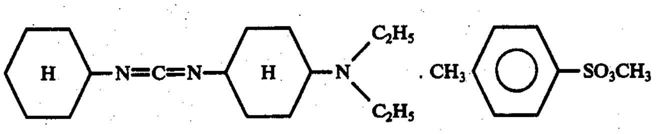
(I-6)
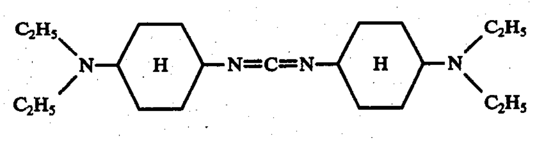
(I-7)
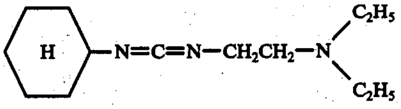
(I-8)
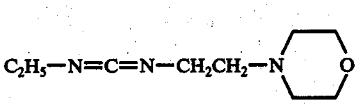
(I-9)
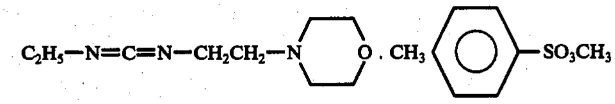
(I-10)
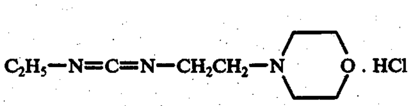
(I-11)
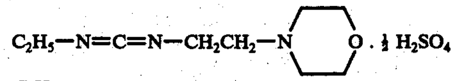
(I-12)
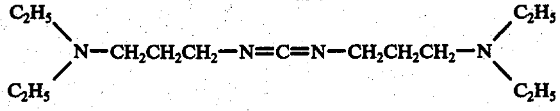
(I-13)
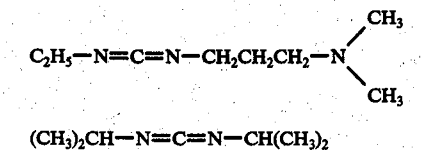
$(CH_3)_2CH—N{=}C{=}N—CH(CH_3)_2$ (I-14)
$CH_2{=}CHCH_2—N{=}C{=}N—CH_2CH_3$ (I-15)
$CH_2{=}CHCH_2—N{=}C{=}N—CH(CH_3)_2$ (I-16)
$CH_2{=}CHCH_2—N{=}C{=}N—CH_2CH{=}CH_2$ (I-17)
(I-18)
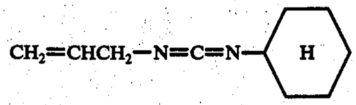
(I-19)
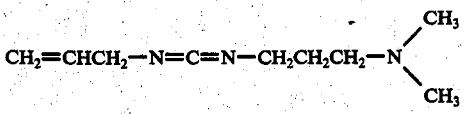

-continued $CH_3OCH_2CH_2CH_2-N=C=N-CH_2CH_3$ (I-20)

$CH_3OCH_2CH_2CH_2-N=C=N-CH_2CH_2SCH_2CH_3$ (I-21)

$CH_2=CHCOOCH_2CH_2-N=C=N-C_2H_5$ (I-22)

$CH_2=CHCOOCH_2CH_2-N=C=N-CH_2CH=CH_2$ (I-23)

(I-24)

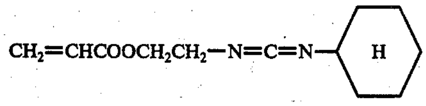

(I-25)

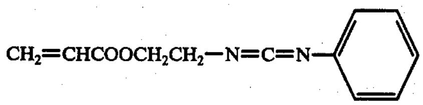

(I-26)

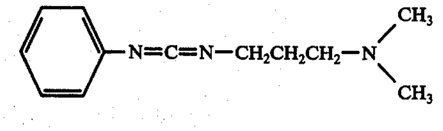

(I-27)

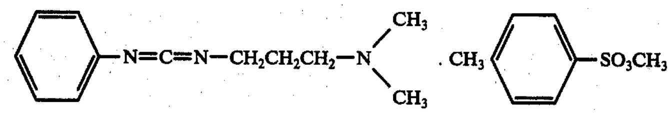

(I-28)

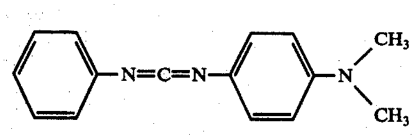

(I-29)

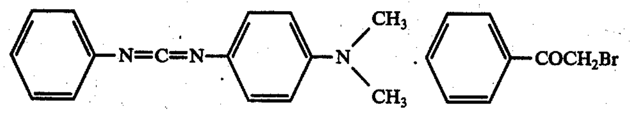

(I-30)

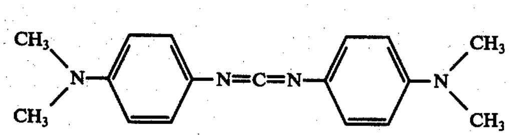

(I-31)

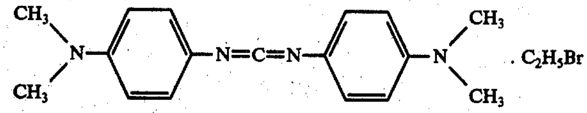

The representative examples of the compounds having at least two vinylsulfonyl groups in the molecule, which compounds are used in the present are shown below.

$CH_2=CHSO_2CH_2CH_2SO_2CH=CH_2$ (II-1)

$CH_2=CHSO_2CH_2CH_2CH_2CH_2CH_2SO_2CH=CH_2$ (II-2)

(II-3)

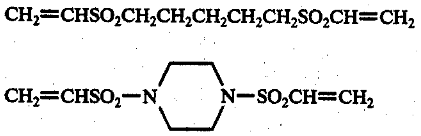

(II-4)

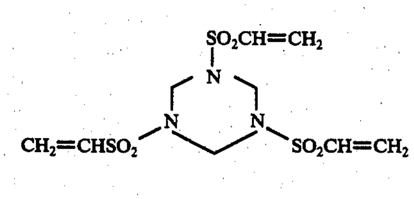

-continued
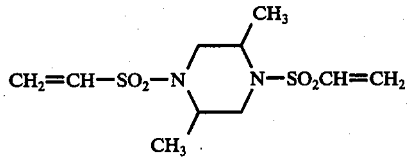
(II-5)
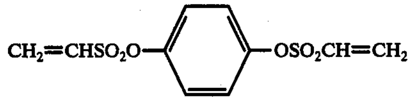
(II-6)
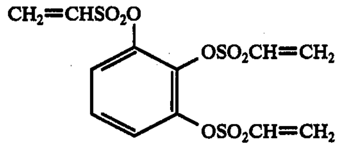
(II-7)
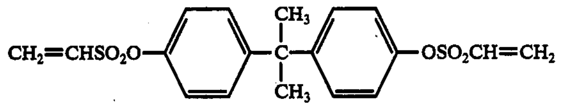
(II-8)
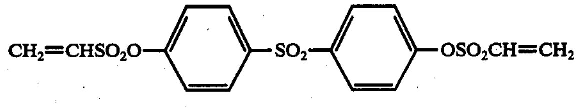
(II-9)
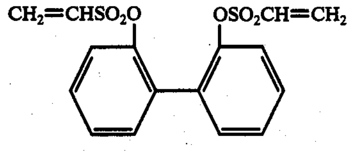
(II-10)
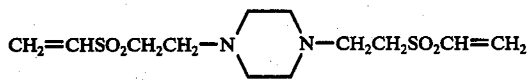
(II-11)
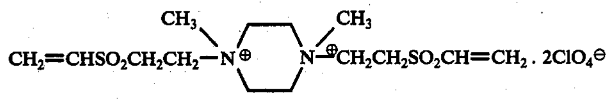
(II-12)
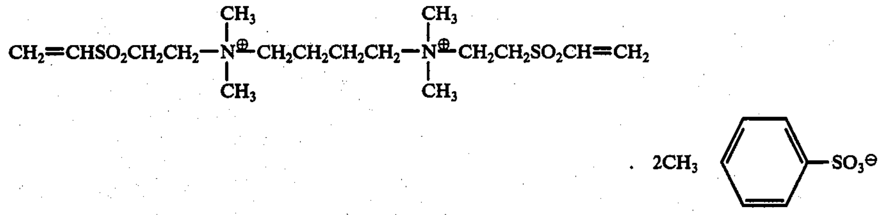
(II-13)
$CH_2{=}CHSO_2CH_2CH_2SO_2CH_2CH_2SO_2CH{=}CH_2$ (II-14)
$CH_2{=}CHSO_2CH_2CH_2OCH_2CH_2NHCONHCH_2CH_2OCH_2CH_2SO_2CH{=}CH_2$ (II-15)
$CH_2{=}CHSO_2CH_2CH_2OCH_2CH_2OCH_2CH_2SO_2CH{=}CH_2$ (II-16)
$CH_2{=}CHSO_2CH_2CH_2OCH_2CH_2CH_2CH_2OCH_2CH_2SO_2CH{=}CH_2$ (II-17)
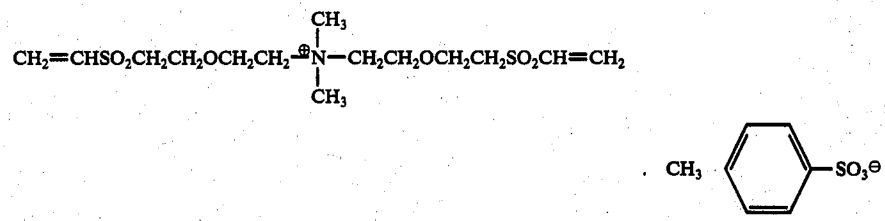
(II-18)
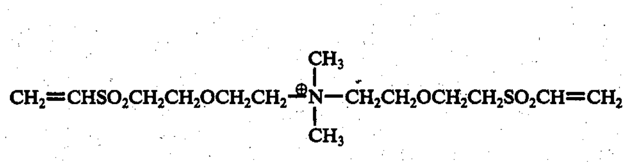
. $ClO_4^{\ominus}$ (II-19)

-continued
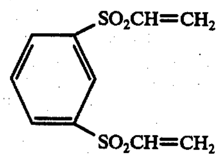
(II-20)
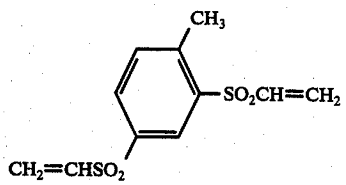
(II-21)
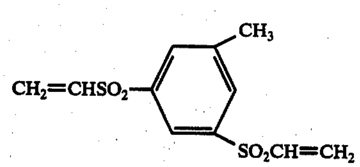
(II-22)
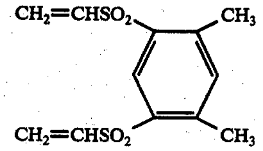
(II-23)
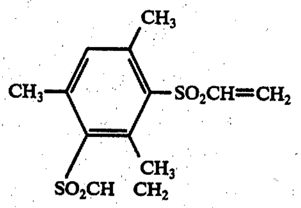
(II-24)
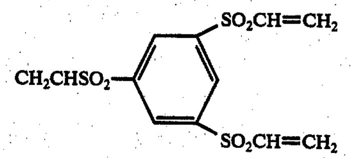
(II-25)
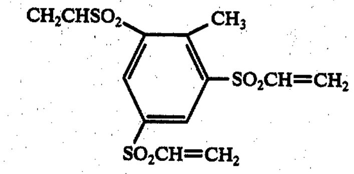
(II-26)
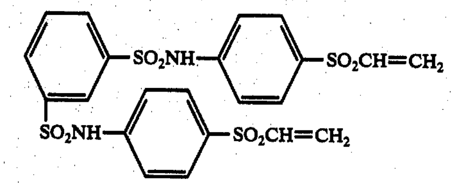
(II-27)
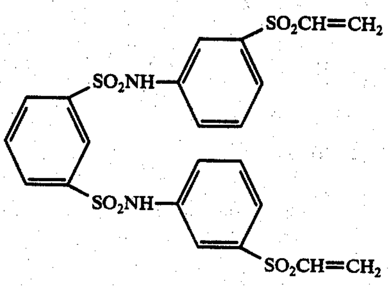
(II-28)

-continued
(II-29)
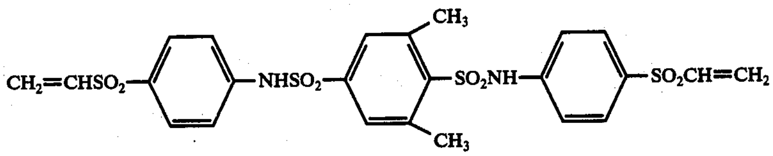
(II-30)
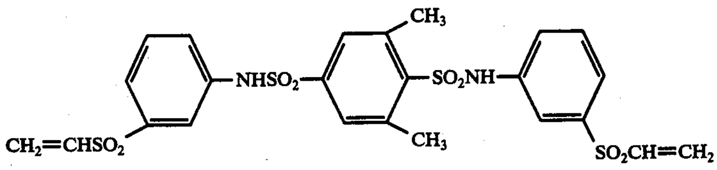
$CH_2{=}CHSO_2CH{=}CH_2$ (II-31)
(II-32)
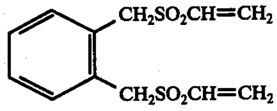
(II-33)
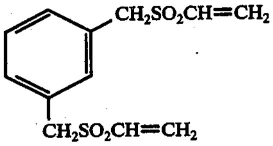
(II-34)
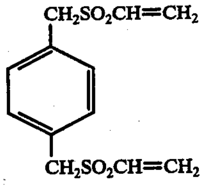
(II-35)
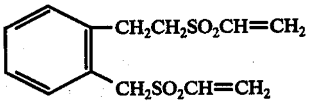
(II-36)
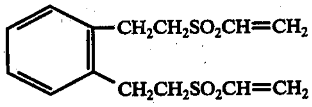
(II-37)
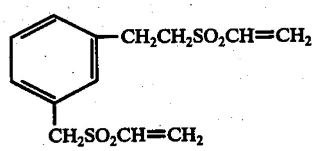
(II-38)
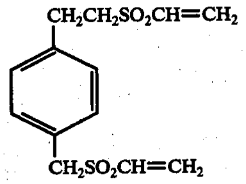
(II-39)
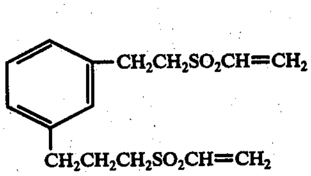

-continued

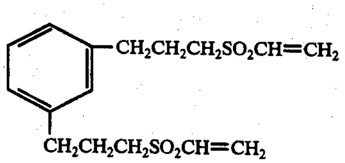

(II-40)

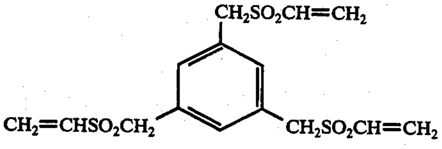

(II-41)

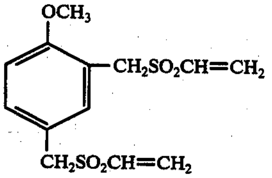

(II-42)

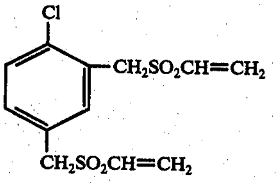

(II-43)

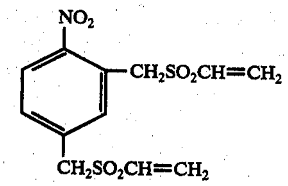

(II-44)

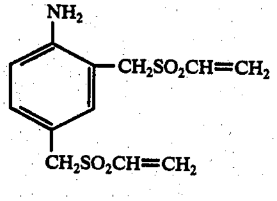

(II-45)

The above mentioned compounds can be synthesized according to the methods described in West German Pat. No. 1,100,942, U.S. Pat. No. 3,490,911 and Japanese patent publication No. 8736/1972. The compound having at least two vinylsulfonyl groups, which compound is used in the present invention covers a compound having a group in which has one —$SO_2$— group bonded to two vinyl groups and is equivalent to two vinylsulfonyl groups, that is, an examplified compound II-31.

The term "gelatin" used in the present invention means not only gelatin itself but also various gelatin derivatives. As such gelatin derivatives, there can be mentioned, for example, acylated gelatin, guanidylated gelatin, carbamylated gelatin, cyanoethylated gelatin and esterified gelatin.

For hardening gelatin films of a light sensitive silver halide photographic material, the hardner may be incorporated into any of the gelatin films, as sub layer, emulsion layer, inter layer, protective layer and backing layer, of the photographic material. Alternatively, the photographic material bearing some of said layers may be immersed in a solution incorporated with the hardner. It is also possible to harder the gelatin films of the photographic material at the time of development as well as befor or after the development by use of any type of bath incorporated with the hardner. In the above cases, the hardner may be used in combination with other hardner in such an amount as not to damage the effect of the present invention.

In incorporating the hardner according to the present invention in any type of the photographic layers of a light-sensitive silver halide photographic material, the hardner is dissolved in water or one or more of conventional organic solvents such as methanol, dimethylformamide and ketones, and the resulting solution is added to a coating liquid for forming the photographic layer. It is also possible to overcoat the outer-most layer of the photographic layers with the above mentioned solution of the hardner.

The amount of the hardner to be added to a coating liquid for forming a gelatin film varies depending on the kind and desired physical and photographic properties of the gelatin film, but is ordinerily 0.01 to 100% by weight, preferably 0.1 to 10% by weight, based on the dry weight of gelatin in the coating liquid. In this case, the amounts of the compounds constituting the hardner vary depending on the kind and desired properties of the gelatin film, but are desirably such that the amount of either one of the compounds is made at least 10% by weight of the total amount of the compounds.

The hardner may be added at any stage during preparation of the coating liquid for forming the gelatin film. To a silver halide emulsion for example, however, the hardner is preferably added after second repening of the emulsion.

Light-sensitive silver halide photographic materials, to which the present invention is applicable, may be any of black-and-white, color and pseudo-color photographic materials, and include all of negative, positive and diffusion transfer-type photographic materials for general use and for printing, X-ray, radiation, etc.

Silver halide emulsions used in the above-mentioned light-sensitive silver halide photographic materials may contain as photosensitive component each and every kind of silver halides such as silver chloride, silver iodide, silver bromide, silver iodobromide, silver chlorobromide, silver chloroiodobromide. Further, the emulsions may have been subjected either to such various chemical sensitization as noble metal sensitization using noble metals such as ruthenium, rhodium, palladium, irridium, platinum, gold, etc. which are, for example, ammonium chloropalladate, potassium chloroplatinate, potassium chloropalladite and potassium chloroaurate; sulfur sensitization using sulfur compounds; reduction sensitization using stannous salts or polyamines; and sensitization using polyalkylene oxide type compounds, or to optical sensitization using cyanine dyes, merocyanine dyes or compounded cyanine dyes. Still further, the emulsions may have been incorporated with various couplers such as colorless couplers, colored couplers or development inhibitor-yielding couplers; stabilizers such as mercury compounds, triazole type compounds, azaindene type compounds, benzothiazolium type compounds or zinc compounds; wetting agents such as dihydroxyalkanes; film property-improvers composed of water-dispersible particulate high polymers obtained by the emulsion polymerization of alkyl acrylate or alkyl methacrylate-acrylic or methacrylic acid copolymers, styrene-maleic acid copolymers or styrene-maleic anhydride half alkyl ester copolymers, coating sids such as polyethylene glycol lauryl ethers; and other various photographic additives.

Furthermore, hydrophilic colloids, which are advantageously used for preparation of the emulsions, include gelatin, colloidal albumin, agar, gum arabic, dextran, alginic acid, cellulose derivatives such as cellulose acetate hydrolyzed to an acetyl content of 19 to 26%, polyacrylamides, imidated polyacrylamides, zein, vinyl alcohol polymers containing urethane-carboxylic acid groups or cyanoacetyl groups, such as vinyl alcoholvinyl cyanoacetate copolymers, polyvinyl alcohols, polyvinyl pyrrolidones, hydrolyzed polyvinyl acetates, polymers obtained by the polymerization of proteins or saturated acylated proteins with monomers having vinyl groups, polyvinyl pyridines, polyvinyl amines, polyaminoethyl methacrylates and polyethyleneimines. These hydrophilic colloids are used also in the case of forming photographic layers other than emulsion layer of photographic materials such as inter layer, protective layer, filter layer, backing layer, etc.

As supports for the light-sensitive silver halide photographic materials, there may be used films composed of polyethylene terephthalates, polycarbonates, polystyrenes, polypropylenes or cellulose acetate, or baryta or polyethylene-laminate papers.

When applied to gelatin films of light-sensitive silver halide photographic materials, the hardener according to the present invention exhibits its effective hardening ability without deteriorating the photographic properties such as speed, etc. of the photographic emulsion layers. Since the hardening action is displayed quite quickly and no post-hardening is substantially brought about, it is possible to obtain photographic materials stabilized in quality. Moreover, even when the photographic materials are stored over a long period of time, the hardener gives no detrimental effect to the photographic emulsion layers but rather makes them more stable, and imparts thereto excellent hardness capable of sufficiently withstanding high temperature quick processing and automatic processing.

The present invention is illustrated in more detail below with reference to examples, but modes of practice of the invention are not limited to the examples, and various modifications are possible within the scope of the invention.

EXAMPLE 1

A silver iodobromide-gelatin emulsion containing 1.7 mole % of silver iodide was incorporated with a gold sensitizer and subjected to second ripening. Thereafter, the emulsion was charged with 4-hydroxy-6-methyl-1, 3, 3*a*, 7-tetrazaindene, and then equally divided into four emulsions. One of these emulsions was coated as it was on a polyester film base and then dried to prepare a control sample. Two of the remaining emulsions were individually incorporated with each of methanol solutions of the compounds (I-13) and (II-1), respectively, in a proportion of $1 \times 10^{-4}$ mole per gram of the gelatin in each emulsion, while the remaining one emulsion was incoporated with a methanol solution of a mixture of the compounds (I-13) and (II-1), each in a proportion of $0.5 \times 10^{-4}$ mole per gram of the gelatin in the emulsion. These three emulsions were individually coated on a polyester film base and then dried to prepare three samples.

The thus prepared control sample and three samples were measured in film hardness according to the following process:

Each sample was incubated at a temperature of 25° C. and a relative humidity (RH) of 55% for each of 1 day (24 hours), 15 days and 30 days. Thereafter, the samples was immersed in a 1.5% aqueous sodium hydroxide solution kept at 50° C. and the time required for initiation of dissolution of the gelatin film of the sample was measured. On the other hand, each sample, which had been incubated under the above conditions, was immersed for 3 minutes in a 3% aqueous sodium carbonate solution at 25° C. Immediately thereafter, the surface of the gelatin film of the sample was rubbed and then scratched with a sapphire needle having a pin point of 1 mm. in radius, and the load (*g*) required for initiation of formation of scratch on the film surface was measured and represented as a film strength. Separately, each sample, which has been incubated at 25° C. and 55% RH for 1 day, was exposed according to the method described in JIS, developed at 40° C. for 30 seconds with an ordinary high temperature quick processing developer containing hydroquinone and phenidone as developing agents, and then measured in speed and fog. The results obtained in the above cases were as shown in Table 1, in which the speed is a relative value measured by assuming the speed of the control sample as 100.

Table 1

| | Film hardness characteristics | | | | | | | |
|---|---|---|---|---|---|---|---|---|
| | Dissolution initiation time (min) After incubation for | | | Film strength (g) After incubation for | | | Photographic properties | |
| Compound | 1 day | 15 days | 30 days | 1 day | 15 days | 30 days | Speed | Fog |
| — | 0.5 | 0.6 | 0.8 | 5 | 10 | 15 | 100 | 0.10 |
| Compound (I-13) | 6 | 11 | 18 | 80 | 100 | 150 | 98 | 0.09 |
| Compound (II-1) | 2 | 5 | 10 | 120 | 170 | 200 | 97 | 0.09 |
| Compound (I-13) Compound (II-1) | 15 | 18 | 22 | 170 | 190 | 220 | 96 | 0.09 |

As is clear from Table 1, it is understood that the combination of two compounds according to the present invention shows extremely quick and excellent hardening action without deteriorating the photographic properties.

EXAMPLE 2

A control sample and three samples were prepared in the same manner as in Example 1, except that the compounds used as the hardeners were replaced by the compounds (I-16) and (II-4). Each sample was measured in film hardness and photographic properties according to the same procedures as in Example 1. The results obtained were as shown in Table 2, in which the speed is a relative value measured by assuming the speed of the control sample as 100.

Table 2

| | Film hardness characteristics | | | | | | | |
|---|---|---|---|---|---|---|---|---|
| | Dissolution initiation time (min) After incubation for | | | Film strength (g) After incubation for | | | Photographic properties | |
| Compound | 1 day | 15 days | 30 days | 1 day | 15 days | 30 days | Speed | Fog |
| — | 0.5 | 0.6 | 0.8 | 5 | 10 | 15 | 100 | 0.10 |
| Compound (I-16) | 7 | 10 | 16 | 60 | 100 | 120 | 99 | 0.09 |
| Compound (II-4) | 5 | 11 | 18 | 150 | 200 | 260 | 97 | 0.09 |
| Compound (I-16) Compound (II-4) | 14 | 17 | 20 | 200 | 240 | 280 | 97 | 0.09 |

As is clear from Table 2, it is understood that in this example also, the combination of two compounds according to the present invention shows quick and excellent hardening action, like in Example 1, without deteriorating the photographic properties.

EXAMPLE 3

A green-sensitive high speed color photographic silver iodobromide-gelatin emulsion containing 3 mole % of silver iodide was subjected to second ripening, and then incorporated with 1-(4'-phenoxy-3'-fulfophenyl)-3-heptadecyl-5-pyrazolone as a magenta coupler. Thereafter, the emulsion was equally divided into four emulsions. One of these emulsions was coated as it was on a cellulose triacetate film base and then dried to prepare a control sample. Two of the remaining emulsions were individually incorporated with each of methanol solutions of the compounds (I-22) and (II-20), respectively, in a proportion of $1 \times 10^{-4}$ mole per gram of the gelatin in each emulsion, while the remaining one emulsion was incorporated with a methanol solution of a mixture of the compounds (I-22) and (II-20), each in a proportion of $0.5 \times 10^{-4}$ mole per gram of the gelatin in the emulsion. These three emulsions were individually coated on a cellulose triacetate film base to prepare three samples.

The film hardness characteristics of each sample were measured according to the same procedures as in Example 1. Further, the photographic properties of each sample were measured in such a manner that the sample was subjected to color development using a color developer containing diethyl-p-phenylenediamine as a developing agent, and the developed sample was subjected to ordinary bleaching, fixing and water-washing and then to sensitometry to measure the speed and fog thereof. The results obtained were as shown in Table 3, in which the speed is a relative value measured by assuming the speed of the control sample as 100.

Table 3

| | Film hardness characteristics | | | | | | | |
|---|---|---|---|---|---|---|---|---|
| | Dissolution initiation time (min) After incubation for | | | Film strength (g) After incubation for | | | Photographic properties | |
| Compound | 1 day | 15 days | 30 days | 1 day | 15 days | 30 days | Speed | Fog |
| — | 0.5 | 0.7 | 0.8 | 5 | 10 | 15 | 100 | 0.12 |
| Compound (I-22) | 7 | 12 | 16 | 85 | 120 | 160 | 99 | 0.11 |
| Compound (II-20) | 5 | 11 | 17 | 110 | 160 | 200 | 98 | 0.11 |
| Compound (I-22) Compound (II-20) | 14 | 16 | 20 | 145 | 180 | 210 | 96 | 0.11 |

As is clear from Table 3, it is confirmed that the combination of two compounds according to the present invention shows extremely quick hardening action, like in the preceding Examples, and does not disturb the color formation of the coupler nor form any color stains.

What we claim is:

1. A method for hardening gelatin, which comprises treating said gelatin with a combination of a compound selected from the group consisting of:

(I-1) 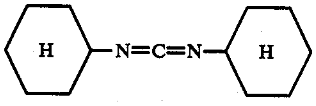

(I-2) 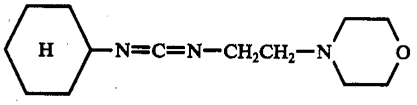

(I-3) 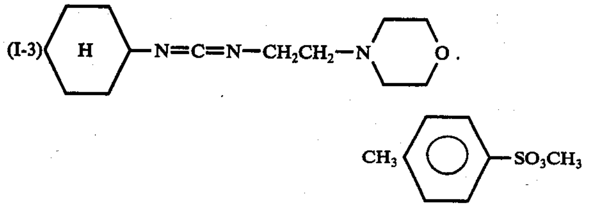

(I-4) 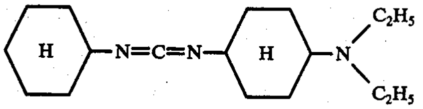

(I-5) 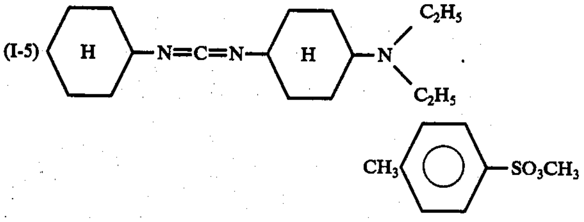

(I-6) 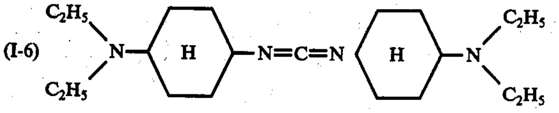

(I-7) 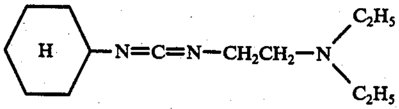

(I-8) 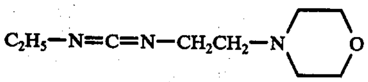

(I-9) 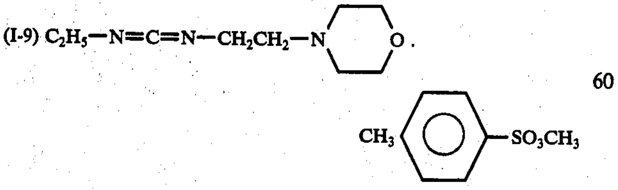

(I-10) 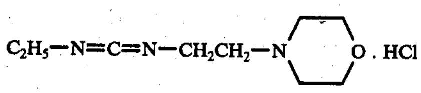

-continued (I-11) 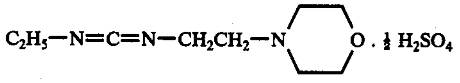

(I-12) $(C_2H_5)_2N-CH_2CH_2CH_2-N{=}C{=}N-CH_2CH_2CH_2-N(C_2H_5)_2$ (I-13) $C_2H_5-N{=}C{=}N-CH_2CH_2CH_2-N(CH_3)_2$ (I-14) $(CH_3)_2CH-N{=}C{=}N-CH(CH_3)_2$ (I-15) $CH_2{=}CHCH_2-N{=}C{=}N-CH_2CH_3$ (I-16) $CH_2{=}CHCH_2-N{=}C{=}N-CH(CH_3)_2$ (I-17) $CH_2{=}CHCH_2-N{=}C{=}N-CH_2CH{=}CH_2$ (I-18) 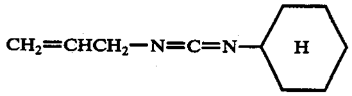

(I-19) $CH_2{=}CHCH_2-N{=}C{=}N-CH_2CH_2CH_2-N(CH_3)_2$ (I-20) $CH_3OCH_2CH_2CH_2-N{=}C{=}N-CH_2CH_3$ (I-21) $CH_3OCH_2CH_2CH_2-N{=}C{=}N-CH_2CH_2SCH_2CH_3$ (I-22) $CH_2{=}CHCOOCH_2CH_2-N{=}C{=}N-C_2H_5$ (I-23) $CH_2{=}CHCOOCH_2CH_2-N{=}C{=}N-CH_2CH{=}CH_2$ (I-24) 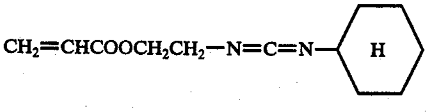

(I-25) 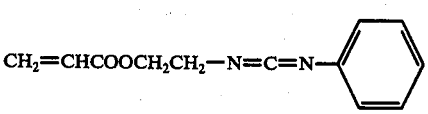

(I-26) 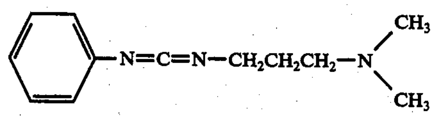

(I-27) 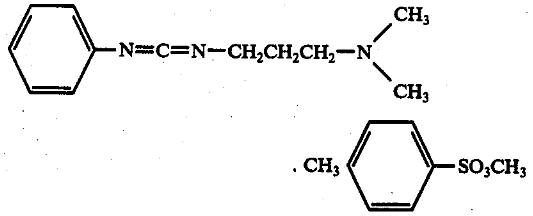

(I-28) 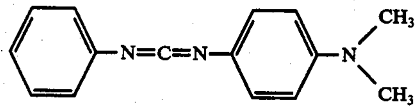

-continued
(I-29)
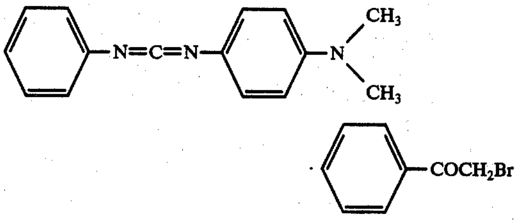
(I-30)
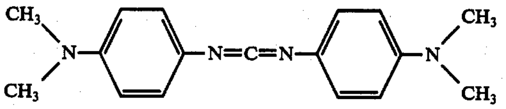
(I-31)
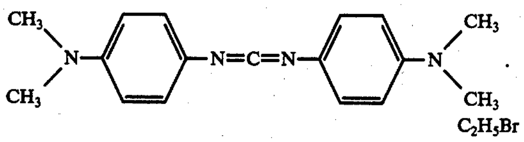
and a compound selected from the group consisting of:
(II-1) $CH_2{=}CHSO_2CH_2CH_2SO_2CH{=}CH_2$
(II-2) $CH_2{=}CHSO_2CH_2CH_2CH_2CH_2CH_2SO_2CH{=}CH_2$
(II-3)
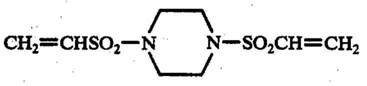
(II-4)
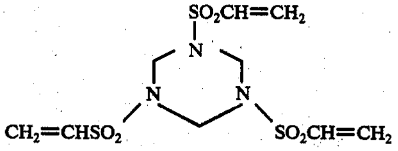
(II-5)
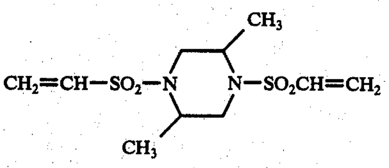
(II-6)
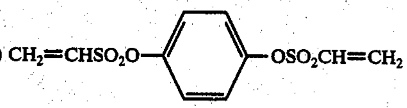
(II-7)
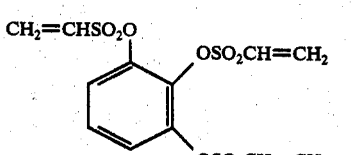
(II-8)
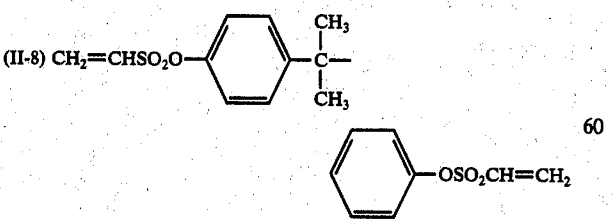
(II-9)
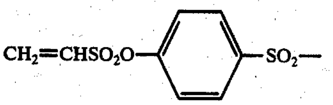
-continued
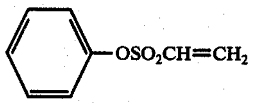
(II-10)
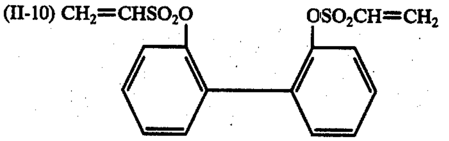
(II-11)
(II-12)
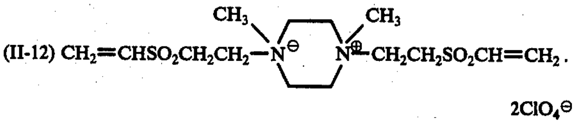
(II-13)
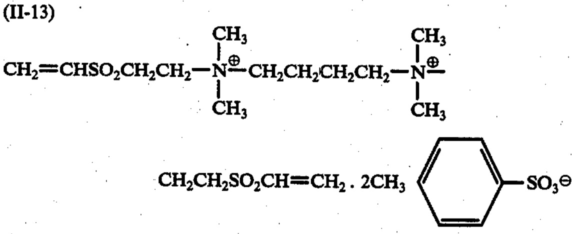
(II-14) $CH_2{=}CHSO_2CH_2CH_2SO_2CH_2CH_2SO_2CH{=}CH_2$
(II-15) $CH_2{=}CHSO_2CH_2CH_2OCH_2CH_2NHCONHCH_2CH_2OCH_2CH_2$-$SO_2CH{=}CH_2$
(II-16) $CH_2{=}CHSO_2CH_2CH_2OCH_2CH_2OCH_2CH_2SO_2CH{=}CH_2$
(II-17) $CH_2{=}CHSO_2CH_2CH_2OCH_2CH_2CH_2CH_2OCH_2CH_2SO_2CH{=}CH_2$
(II-18)
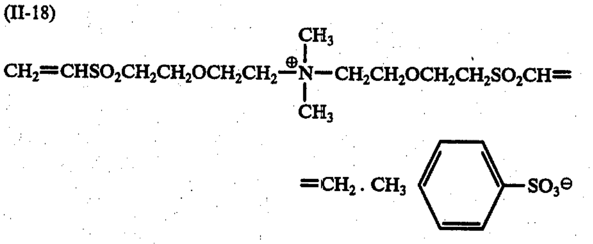
(II-19)
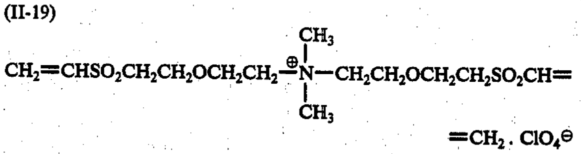
(II-20)
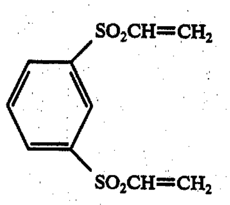
(II-21)
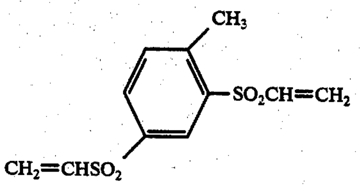

-continued
(II-22)
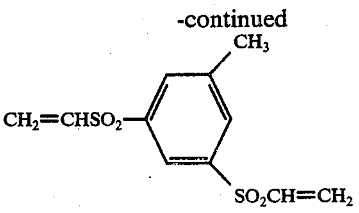
(II-23)
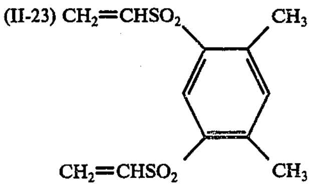
(II-24)
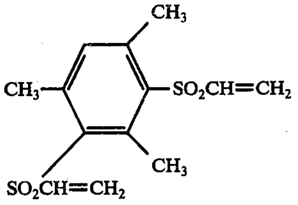
(II-25)
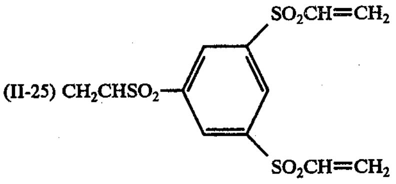
(II-26)
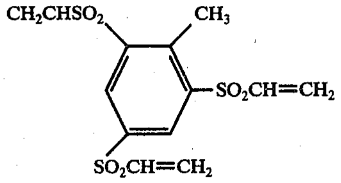
(II-27)
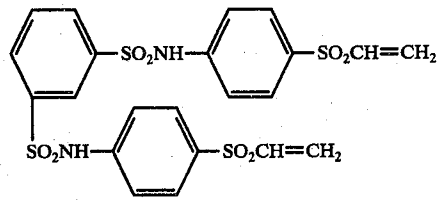
(II-28)
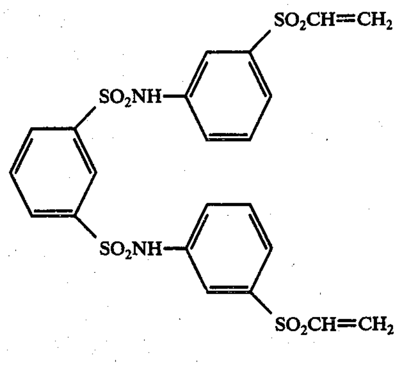
(II-29)
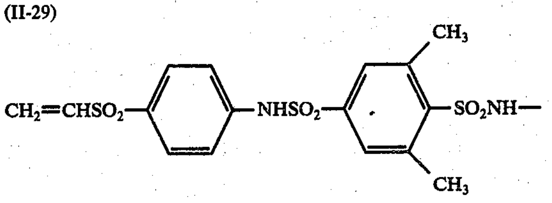
-continued
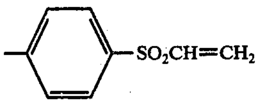
(II-30)
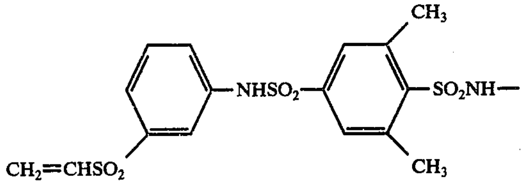
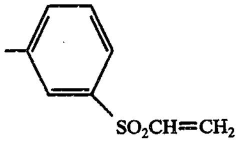
(II-31) $CH_2{=}CHSO_2CH{=}CH_2$
(II-32)
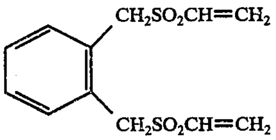
(II-33)
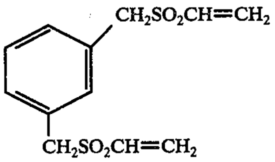
(II-34)
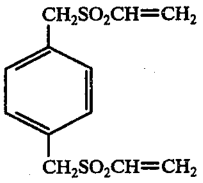
(II-35)
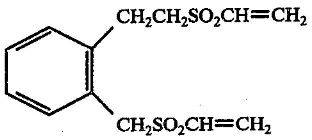
(II-36)
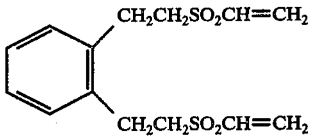
(II-37)
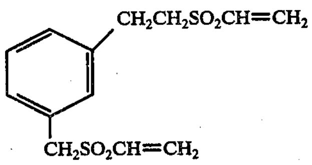
(II-38)
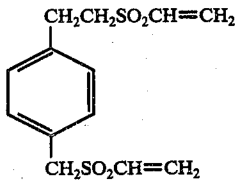

-continued (II-39)

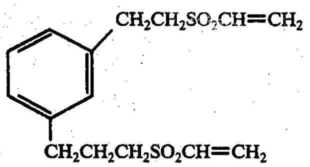

(II-40)

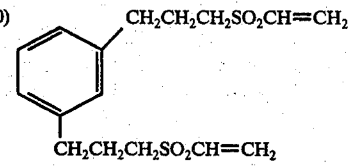

(II-41)

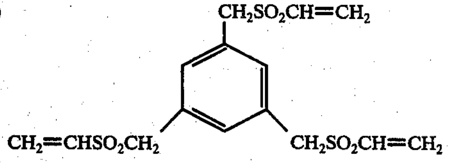

(II-42)

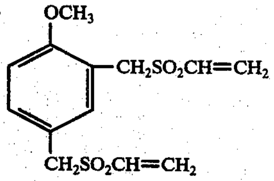

(II-43)

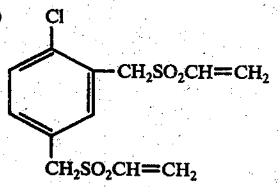

-continued (II-44)

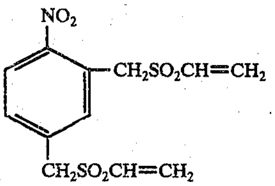

(II-45)

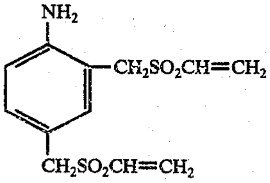

2. A method as claimed in claim 1, wherein said gelatin is that which exists in a gelatin-containing photographic layer of a light-sensitive silver halide photographic material.

3. A method as claimed in claim 1 wherein said compound is incorporated into a processing liquid which is to be brought into contact with a gelatin-containing layer of an exposed light-sensitive silver halide photographic material.

4. A method as claimed in claim 1, wherein said gelatin is that which exists in a gelatin-containing liquid capable of forming a photographic layer of a light-sensitive silver halide photographic material.

5. A method as claimed in claim 1, wherein said hardener combination is used in the amount of from 0.01 to 100% by weight, based on the dry weight of the gelatin, either one component of said combination comprising at least 10% by weight of said combination.

6. Modified gelatin which is obtained by the method of claim 1.

* * * * *